US012665408B2

(12) United States Patent
Ramos et al.

(10) Patent No.: US 12,665,408 B2
(45) Date of Patent: Jun. 23, 2026

(54) ELECTRICAL SAFETY SYSTEM WITH TIMER

(71) Applicant: Belgravia Wood Limited, Hong Kong (CN)

(72) Inventors: Jaime Ramos, Moorpark, CA (US); Alan Leung, Hong Kong (CN)

(73) Assignee: Belgravia Wood Limited, Hong Kong (CN)

( * ) Notice: Subject to any disclaimer, the term of this patent is extended or adjusted under 35 U.S.C. 154(b) by 28 days.

(21) Appl. No.: 18/041,985

(22) PCT Filed: Aug. 19, 2020

(86) PCT No.: PCT/IB2020/000678
§ 371 (c)(1),
(2) Date: Feb. 16, 2023

(87) PCT Pub. No.: WO2022/038389
PCT Pub. Date: Feb. 24, 2022

(65) Prior Publication Data
US 2023/0318279 A1 Oct. 5, 2023

(51) Int. Cl.
*H02H 3/02* (2006.01)
*H01H 83/04* (2006.01)
(Continued)

(52) U.S. Cl.
CPC ............ *H02H 3/027* (2013.01); *H01H 83/04* (2013.01); *H02H 3/165* (2013.01)

(58) Field of Classification Search
CPC ......... H02H 3/027; H02H 3/165; H01H 83/04
See application file for complete search history.

(56) References Cited

U.S. PATENT DOCUMENTS 4,440,503 A * 4/1984 Arichi .................... G04F 1/005
968/802
5,742,466 A * 4/1998 Kram .................... H01R 25/00
361/111
(Continued)

FOREIGN PATENT DOCUMENTS

CN 104065029 A 9/2014
CN 106253216 A 12/2016
(Continued)

OTHER PUBLICATIONS

European Extended Search Report dated Mar. 4, 2024, 8 pages.
(Continued)

*Primary Examiner* — Scott Bauer
(74) *Attorney, Agent, or Firm* — Finnegan, Henderson, Farabow, Garrett & Dunner, LLP

(57) ABSTRACT

An electrical safety apparatus includes a ground fault circuit interrupter (GFCI) module, a timer module and a housing without a display screen. The GFCI module includes a sensor configured to output a differential current signal according to a current flowing to and from an electrical load, a ground fault circuit interrupter circuit in electrical communication with the sensor, and one or more switches arranged on one or more communication paths for supplying power to the electrical load. The timer module is in electrical communication with the GFCI module and configured to generate a timer signal. Responsive to the differential current signal or the timer signal, the ground fault circuit interrupter circuit generates a driving signal to selectively open or close the one or more switches. The housing encloses the GFCI module and the timer module.

20 Claims, 12 Drawing Sheets

300

(51) Int. Cl.
    *H02H 3/027*      (2006.01)
    *H02H 3/16*       (2006.01)

(56)             References Cited

U.S. PATENT DOCUMENTS

| | | | |
|---|---|---|---|
| 9,071,053 B2 | 6/2015 | Leung | |
| 2008/0265685 A1* | 10/2008 | Blair ...................... | H05B 47/16 |
| | | | 307/141 |
| 2014/0285927 A1* | 9/2014 | Leung ..................... | H02H 3/16 |
| | | | 361/42 |
| 2014/0303781 A1* | 10/2014 | Potucek ............... | A61H 33/005 |
| | | | 700/275 |
| 2019/0148930 A1 | 5/2019 | Acosta | |
| 2019/0178919 A1* | 6/2019 | Magno ................... | G08B 25/10 |

FOREIGN PATENT DOCUMENTS

| | | |
|---|---|---|
| CN | 206250747 U | 6/2017 |
| CN | 207251176 U | 4/2018 |

OTHER PUBLICATIONS

International Search Report for International Application No. PCT/IB2020/000678 dated May 17, 2021, 2 pages.
Canadian Office action for Canadian Application No. 3190041 dated Feb. 12, 2026 (3 pages).

* cited by examiner

300

310

320

330

340

LED 1    1 HR
LED 2    2 HR
LED 3    4 HR
LED 4    8 HR

370

350

360

<u>400</u>

400

800b

800a

800d

800c

800g

800f

800e

800h

ELECTRICAL SAFETY SYSTEM WITH TIMER

CROSS REFERENCES TO RELATED APPLICATIONS

This application is the National Phase of PCT International Application No. PCT/IB2020/000678, filed on Aug. 19, 2020. The entire contents of the above-referenced applications are incorporated herein by reference.

TECHNICAL FIELD

The present disclosure relates to electrical safety systems and timing systems, and more particularly, to ground fault circuit interrupter systems with integrated timers.

BACKGROUND

A ground fault circuit interrupter ("GFCI") system can be used as an electrical safety system. GFCI systems can use residual-current device to protect people and electronic devices from electric shock or excess electric current. More specifically, GFCI systems shut off an electric circuit when detecting a current flowing along an unintended path into the ground, such as a path through a person's body. Moreover, GFCI systems can react quickly when detecting unintended current flow, and thus minimizing the damage or harm caused to electronic devices or users.

SUMMARY

Embodiments of the present disclosure provide an electrical safety apparatus. The electrical safety apparatus includes a ground fault circuit interrupter (GFCI) module, a timer module, and a housing without a display screen. The GFCI module includes a sensor configured to output a differential current signal according to a current flowing to and from an electrical load, a ground fault circuit interrupter circuit in electrical communication with the sensor, and one or more switches arranged on one or more communication paths for supplying power to the electrical load. The timer module is in electrical communication with the GFCI module and configured to generate a timer signal. Responsive to the differential current signal or the timer signal, the ground fault circuit interrupter circuit generates a driving signal to selectively open or close the one or more switches. The housing encloses the GFCI module and the timer module.

Embodiments of the present disclosure also provide a method for providing electricity to a device. The method includes: disconnecting an input line from the device by opening one or more switches when a current sensor in a ground fault circuit interrupter module senses an undesired change in current; indicating a configuration of a timer module by one or more indicator light-emitting diodes arranged on a housing without a display screen, and generating a first timer signal or a second timer signal by the timer module according to the configuration accordingly; responsive to receipt of the first timer signal, generating, by the ground fault circuit interrupter module, a first signal for connecting the input line to the device; and responsive to receipt of the second timer signal, generating, by the ground fault circuit interrupter module, a second signal for disconnecting the input line from the device.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims. It is to be understood that both the foregoing general description and the following detailed description are exemplary and explanatory only and are not restrictive of the disclosed embodiments, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Although exemplary embodiments of the disclosure are explained in detail as being an electrical safety system (such as a ground fault circuit interrupter ("GFCI") system) with an integrated timer, it is to be understood that other embodiments are contemplated, such as embodiments employing other types of electrical safety systems, residual current devices, GFCI systems, and/or timers. Accordingly, the disclosure should not be limited in its scope to the details of construction and arrangement of components set forth in the following description or examples. Other embodiments can be practiced or carried out in various ways.

To facilitate the understanding of principles and features of the methods and apparatus disclosed in the present disclosure, various illustrative embodiments are discussed below. In particular, various embodiments of the present disclosure are described as a GFCI system with an integrated timer. Some aspects of the disclosure, however, may be applicable to other contexts, and embodiments employing these aspects can be contemplated. For example, some aspects of the disclosure may be applicable to various types of electrical safety systems, such as various types of electrical safety switches. Accordingly, where the terms "GFCI," "GFCI system," "residual current device," "timer," and related terms are used throughout this disclosure, it will be understood that other devices, entities, objects, or activities can be applied in various embodiments of the disclosure.

As described above, existing electrical safety systems and timers are manufactured and sold separately. Thus, a consumer must purchase multiple devices and install the devices together to obtain an electrical safety system with timer. In addition to extra costs, the use of multiple devices can cause the electrical system to be overly complex and can increase the risk of electrical malfunction and/or electrical shock during the use.

Figure 1:
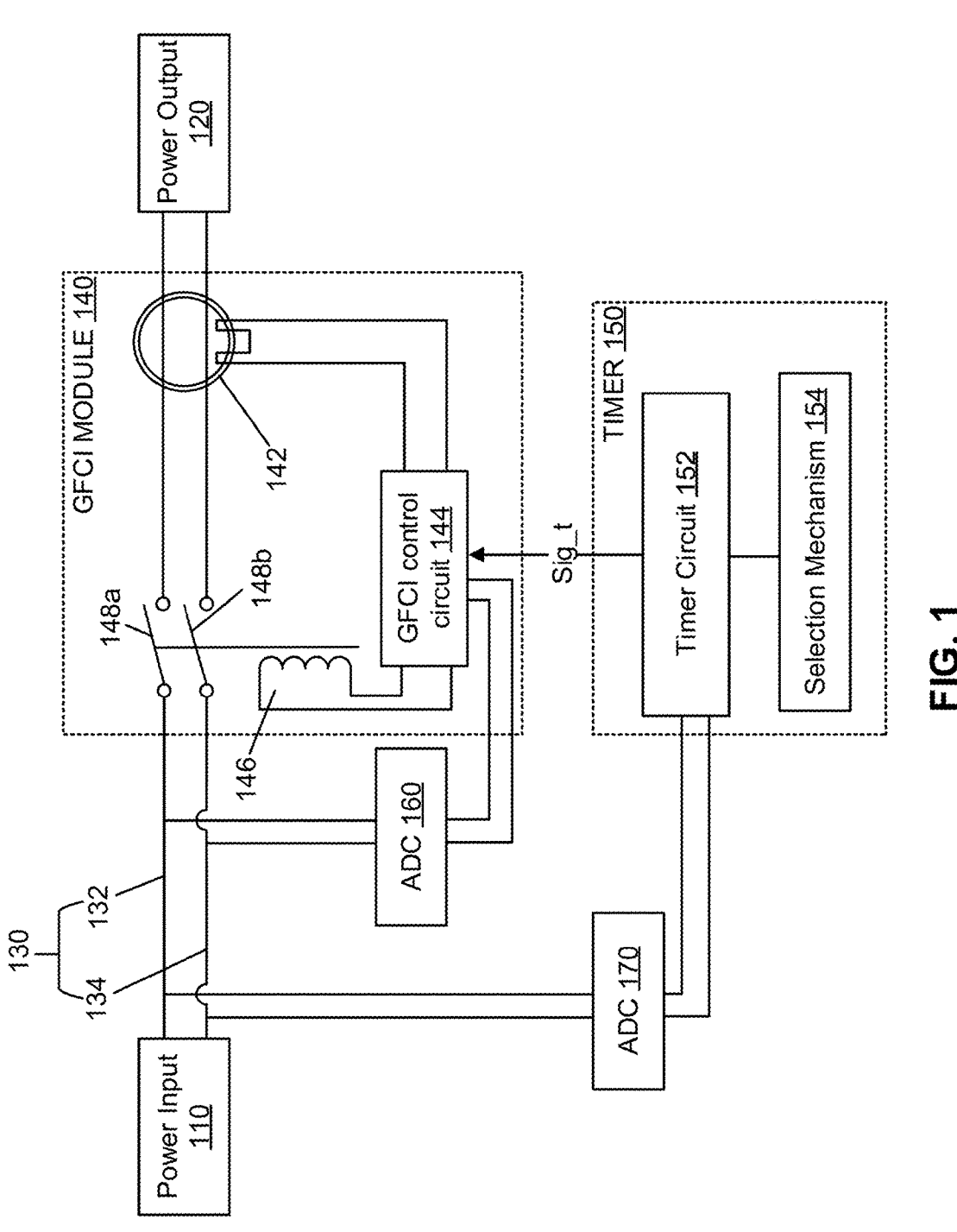
FIG. 1 illustrates an exemplary electrical safety apparatus with a timer, consistent with some embodiments of the present disclosure.

Reference is made to FIG. 1, which illustrates an exemplary electrical safety apparatus 100 having an integrated timer 150, consistent with some embodiments of the present disclosure. As shown in FIG. 1, electrical safety apparatus 100 includes a power input 110, a power output 120, an electrical transmission line 130 enabling electrical communication between power input 110 and power output 120, a GFCI module 140, a timer 150, power converters 160 and 170. In some embodiments, GFCI module 140 includes a sensor 142, a GFCI control circuit 144, a solenoid 146, and switches 148a, 148b. Timer 150 includes a timer circuit 152 and a selection mechanism 154. In some embodiments, timer circuit 152 can be a digital timer circuit. Power converters 160 and 170 may be implemented by various AC/DC converters (ADCs), such as buck-type AC/DC converters or boost-buck type AC/DC converters.

Power input 110 to the electrical safety apparatus 100 can be an electrical input, such as an AC input line, which can be electrically connected with a power plant, generator, battery, or any other power supply device.

The electrical transmission line(s) 130 are electrically connected between power input 110 and power output 120. In some embodiments, the electrical transmission line(s) 130 may include a "hot" or charged communication line (e.g., transmission line 132) and a neutral communication line (e.g., transmission line 134). Transmission lines 132, 134 enable electrical communication between power input 110 and power output 120 (e.g., a load device). Alternatively stated, electricity power can flow, via transmission line 132, from power input 110 to power output 120, and flow, via transmission line 134, from power output 120 back to power input 110, thereby completing the AC power flow in electrical safety apparatus 100.

In some embodiments, power output 120 can be connected to a load device, such as an electrically powered device (e.g., an electrically powered pump, a motor, etc.).

As shown in FIG. 1, one or more switches 148a, 148b are arranged between electrical transmission line 130 that communicates power input 110 and power output 120. Switches 148a, 148b are configured to control (e.g., enable or disable) communication paths between power input 110 and power output 120. In some embodiments, in response to corresponding enabling control signal(s), switches 148a, 148b can be closed in order to enable the communication paths, such that electricity can flow between power input 110 and power output 120. On the other hand, in response to corresponding disabling control signal(s), switches 148a, 148b can be open, in order to prevent electricity transmission between power input 110 and power output 120. As shown in FIG. 1, in some designs, a first switch 148a can be electrically coupled with transmission line 132, and a second switch 148b can be electrically coupled with transmission line 134, but the present disclosure is not limited thereto.

In some situations, undesirable circumstances can arise that disturb the electricity flow in electrical safety apparatus 100. For example, a ground fault may occur when the current flows through an outside object into the ground. This may occur, for example, when a person touches exposed electrical component and is electrically shocked, causing electricity to flow through the person and into the ground. This can also occur when the load (or the electrically powered device) is, undesirably, electrically connected to the ground via water and/or another electrical conducting path.

In cases where a person is being shocked, or where the electrical flow is unintentionally and undesirably going to ground, as described above, electrical safety apparatus 100 can enable a protection function to stop the electricity flow in the circuit.

Particularly, electrical safety apparatus 100 can be configured to sense changes of the current flowing through electrical transmission line 130 when undesirable circumstances arise. These changes of the current often result from the electricity flow being directed into the ground. More particularly, since a part or all of the electricity power flows from power input 110 into the ground, the current flowing back from the load back to power input 110 is reduced. Thus, a difference exists between the amount of current flowing toward the load and the amount of current flowing back from the load. By sensing this difference in current, electrical safety apparatus 100 can detect the abnormal operation and stop the electricity flow toward the load. Accordingly, electrical safety apparatus 100 can prevent the circuit from providing an extended electric shock.

As shown in FIG. 1, sensor 142 in GFCI module 140 may be a sense coil or other differential circuit transformer. Sensor 142 can be located around transmission lines 132, 134 and configured to react in response to a difference in the current amount flowing through transmission line 132 and transmission line 134. In normal operation, sensor 142 produces no signal, a neglectable signal, or a "no-error" type signal to GFCI control circuit 144, in response to zero or neglectable difference between the current flowing through transmission lines 132, 134.

When the electricity flow across power output 120 is disturbed, such as when a person is being shocked, the current difference between transmission line 132 and transmission line 134 causes sensor 142 to output an increased signal, or an "error" type signal to GFCI control circuit 144. GFCI control circuit 144 can receive the signal and accordingly determine whether the current difference exceeds a predetermined threshold value. In response to a determination that the current difference exceeds the threshold value, GFCI control circuit 144 controls one or more of switches 148a, 148b to open, which stops the electricity flow through the circuit. In some embodiments, for example, GFCI control circuit 144 can output a driving signal to solenoid 146, causing solenoid 146 to open one or more of the switches 148a, 148b respectively on transmission lines 132 and 134. In this manner, GFCI module 140 can stop the electricity flow and prevent a person or object from receiving an electrical shock.

As shown in FIG. 1, timer 150 can be integrated into electrical safety apparatus 100, which provide a simpler, safer, and more cost-efficient design than traditional systems. In some embodiments, timer 150 can provide one or more command signals Sig_t, such as an "open" signal, a "close" signal, or both, to GFCI module 140. Particularly, timer 150 can transmit the "open" signal or "close" signal via one or more wired or wireless communications to GFCI module 140. For example, in some embodiments, GFCI module 140 and timer 150 are coupled by wired communication, while in some other embodiments, timer 150 includes a wireless transmitter or transceiver to send command signals Sig_t, and GFCI module 140 includes a corresponding wireless receiver or transceiver to receive command signals Sig_t. Particularly, command signals Sig_t, can be sent by timer circuit 152 in timer 150, and received by GFCI control circuit 144.

In some embodiments, an "open" signal can cause GFCI module 140 to prevent electricity from flowing from power input 110 toward power output 120. More specifically, the "open" signal can cause GFCI module 140 to open one or more of switches 148a, 148b on transmission line 132 and/or transmission line 134, thereby opening the circuit and preventing the electricity flow through the circuit. Similarly, in some embodiments, the "close" signal can cause the electrical safety apparatus 100 to begin providing electricity toward power output 120. In particular, the "close" signal can cause GFCI module 140 to close one or more of switches 148a, 148b on transmission line 132 and/or transmission line 134. In this manner, timer circuit 152 can control, via GFCI module 140, whether power input 110 can provide power through transmission lines 132, 134 toward and through power output 120.

In some embodiments, timer circuit 152 can provide one or more command signals Sig_t, such as "open" or "close" signals, to another solenoid or other known device (not shown), to open or close an additional switch or switches (not shown) on transmission line 132 and/or transmission line 134. Accordingly, timer 150 may independently enable or disable the electricity transmission, when power input 110 provides electricity to power output 120 independent of GFCI module 140.

In some embodiments, selection mechanism 154 provides an interface for a user to adjust the configuration or settings of timer 150. For example, selection mechanism 154 can be implemented by a selector switch, a dial, a button, a touchpad, a click wheel, and the like that are capable of providing the user with one or more options for setting timer 150. In some embodiments, for example, selection mechanism 154 can enable the user to set timer 150 so that timer circuit 152 outputs an "open" signal, "close" signal, or both at a specified time or times.

In some embodiments, the specified time or times can be defined in one or more ways. The specified time, for example, can be an amount of time in the future. In other words, a user can use selection mechanism 154 to set timer circuit 152 to output an "open" signal or "close" signal to GFCI module 140 in an amount of time in the future, such as in 1 minute, 5 minutes, 30 minutes, 45 minutes, 1 hour, or any other amount of time.

In some embodiments, the user can use selection mechanism 154 to set timer circuit 152 to output one or more "open" signals or "close" signals at multiple times. Thus, the user can set timer 150 to provide power to an electrical device connected to power output 120 at some time in the future and to terminate the supply of power later on.

In some embodiments, the specified time can be a specific time point. For example, the user can use selection mechanism 154 to program timer circuit 152 to output an "open"

command signal or "close" command signal at one or more specific times, such as at 9:00 am, 12:00 pm, 3:30 pm, 9:45 pm, 12:01 am, or at any other time. Timer 150 can therefore be configured to open or close one or more of the switches 148a, 148b at one or more predetermined times of a day, thereby providing power to or preventing the flow of power to an electrical device (e.g., a device connected to power output 120). Accordingly, in some embodiments, timer 150 can include a clock, or other known device that records or receives the current time value.

In some embodiments, the specified time can be an operating time. More specifically, a user can use selection mechanism 154 to set timer circuit 152 so that power is delivered to an electrical device (e.g., a device connected to power output 120) for a specified time. In some embodiments, timer 150 can be programmed to provide power to the electrical device for the same amount of specified time, and during the same time, each day or on user-selected days. In some embodiments, for example, a user can use selection mechanism 154 to select the specified time, i.e., the amount of time to provide power to the electrical device, such as 15 minutes or 8 hours. After an amount of time is selected, timer circuit 152 can send a "close" signal, thereby providing power to the electrical device. When the specified time has passed, and the electrical device has therefore received power for the desired amount of time, timer circuit 152 can send an "open" signal, thereby terminating the flow of power to the electrical device. In some embodiments, timer circuit 152 can send the "close" and "open" signals at the same time of the day every day, or on user-selected days. In this manner, the electrical device (e.g., a pool pump) can be "on" or running at the same time each day. In some embodiments, when power is not provided to electrical safety apparatus 100 (such as, for example and not limited thereto, when electrical safety apparatus 100 is unplugged from an outlet), the specified time can reset to a factory default, such as 5 minutes or 6 hours.

In some embodiments, a maximum operating time can be preset to comply with various standards or requirements, such as an energy conservation standard or a safety standard. For example, in some embodiments, the maximum operating time can be set to 10 hours. Accordingly, in a default setting, timer circuit 152 can be configured to provide a corresponding signal to disable the power transmission after 10 hours of operation. In addition, timer circuit 152 can automatically send the "open" signal to disable the power transmission, if electrical safety apparatus 100 detects that the maximum operating time has been reached, so as to comply with standards or requirements.

In some embodiments, as mentioned above, selection mechanism 154 can include one or more buttons, such as a "set" button. A single press on the button will power on the timer and/or increment (or decrement) the specified time by a predetermined amount of time, such as 5 minutes, 1 hour, or 2 hours. Multiple presses on the button can increment (or decrement) the specified time by additional time each time the button is pressed. In some embodiments, holding the button down can add additional time onto the specified time for each increment or decrement of time that the button is held. In some embodiments, for example, 5 minutes can be added to the specified time for each second that the button is held down. In this manner, timer 150 can be set in different operating modes. In some operating modes, the specified time is an amount of time in the future. In some other operating modes, the specified time is a specific time during a day. In yet some other operating modes, the specified time is the operation time of the electrical device.

It is noted that, in various embodiments, timer 150 and electrical safety apparatus 100 can be realized without any visual display panel or display screen. That is, in some embodiments, electrical safety apparatus 100 does not include any display screen for indicating the specified time or the mode. For example, in some embodiments, electrical safety apparatus 100 does not provide any liquid-crystal display (LCD) or other active screen for the user to display the information. By eliminating the display screen, the size and the manufacturing cost of electrical safety apparatus 100 can be reduced. In addition, the design of electrical safety apparatus 100 can be more flexible without any display screen.

Instead of using display screens, in some embodiments, electrical safety apparatus 100 can include multiple indicator light-emitting diodes (LEDs) configured to indicate different operating modes or the specified time by a lighting pattern of the indicator LEDs.

In some embodiments, components of GFCI module 140 and timer 150 can be powered by electricity that is directed through one or more AC-DC power converters 160 and 170. As shown in FIG. 1, for example, GFCI control circuit 144 can be powered by electricity that is directed through a first AC-DC power converter 160, and timer 150 can be powered by electricity that is directed through a second AC-DC power converter 170.

Figure 2:
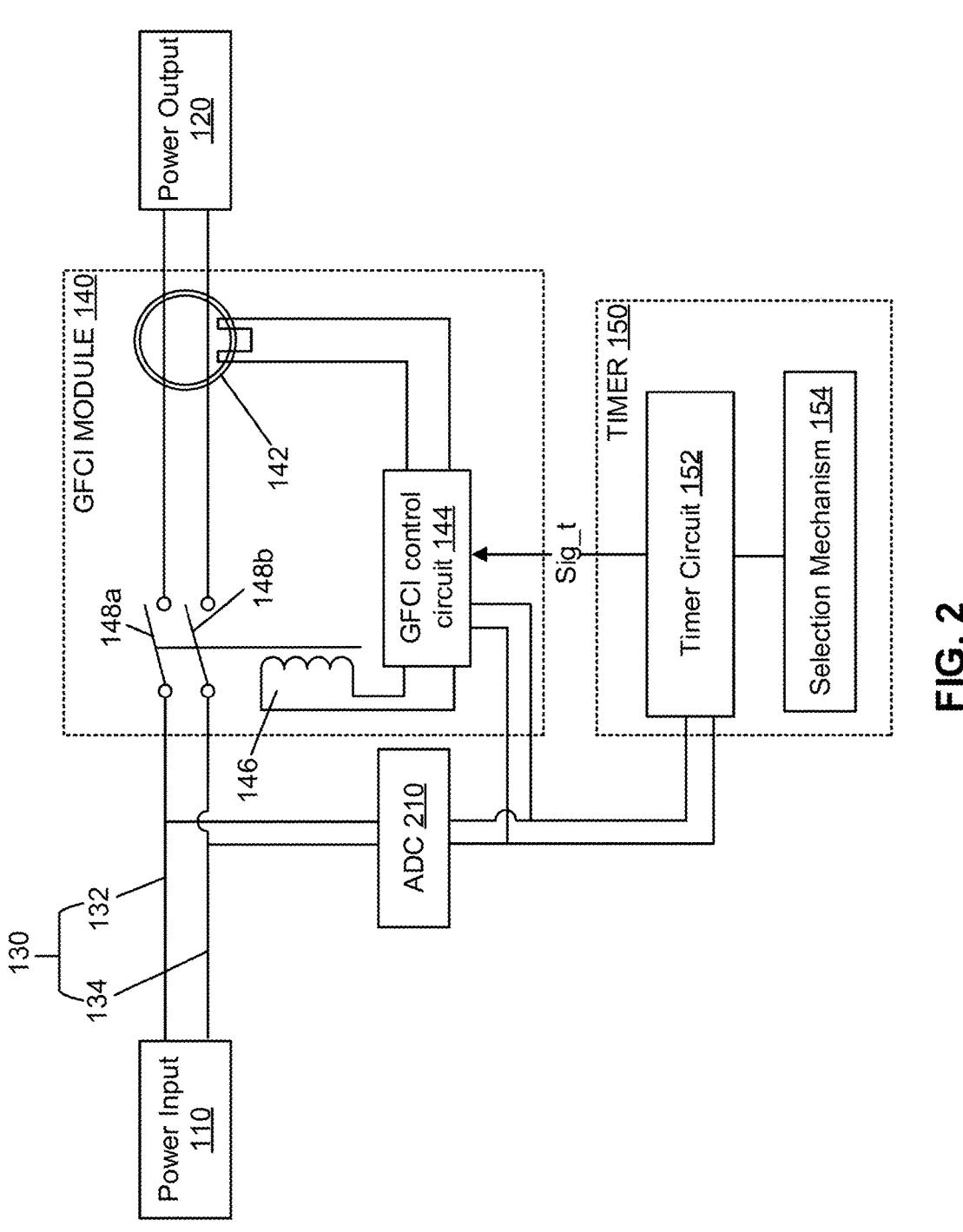
FIG. 2 illustrates an exemplary electrical safety apparatus with a timer, consistent with some embodiments of the present disclosure.

Reference is made to FIG. 2, which illustrates an exemplary electrical safety apparatus 200, consistent with some embodiments of the present disclosure. As shown in FIG. 2, in some other embodiments, GFCI module 140 and timer 150 can be powered by electricity that is directed through a single AC-DC converter 210 connected to both GFCI module 140 and timer 150.

Figure 3:
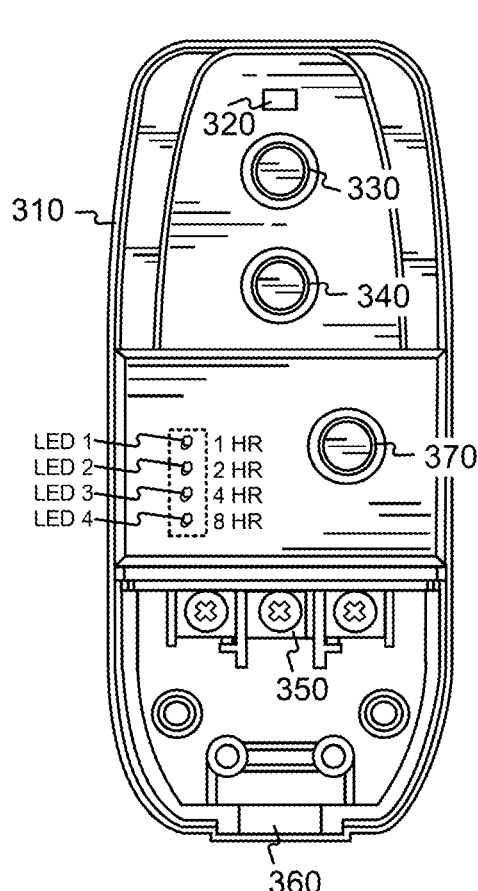
FIG. 3 illustrates an exemplary housing for an electrical safety apparatus with a timer, consistent with some embodiments of the present disclosure.

Reference is made to FIG. 3, which illustrates an exemplary electrical safety apparatus 300 with a housing 310, consistent with some embodiments of the present disclosure. In some embodiments, GFCI module 140 and timer 150 can be assembled inside housing 310. In some embodiments, housing 310 may have one or more buttons 370 functioned as selection mechanism 154 and indicator LEDs LED1-LED4 attached to an outer portion of housing 310. As shown in FIG. 3, numbers or texts can be printed or provided near to indicator LEDs LED1-LED4 for indicating the setting or the time value associated with each of the LEDs on the outer portion of housing 310.

For example, in FIG. 3, indicator LEDs LED1-LED4 respectively represent 1, 2, 4, and 8 hours. When electrical safety apparatus 300 is configured at its default setting of 10 hours, indicator LEDs LED2 and LED4 are on and indicator LEDs LED1 and LED3 are off to indicate the specified time being 10 hours. Each time the user presses button 370, the specified time can be decremented by 1 hour. When the specified time reaches zero, it automatically switches back to the default setting of 10 hours. For example, the user can set timer circuit 152 with an operating time of 4 hours by pressing button 370 six times in a row, so that the specified time is decremented by 6 hours from the default setting of 10 hours. With this configuration, indicator LED LED3 is on and indicator LEDs LED1, LED2 and LED4 are off to indicate the specified time being 4 hours, and the power is delivered to the load connected to power output 120 for 4 hours. In some other embodiments, electrical safety apparatus 300 can be configured at its default setting of 1 hour, with only indicator LED LED1 is on, and have the specified time incremented by 1 hour for each press by the user. When the specified time reaches its preset maximum value, it automatically switches back to the default setting of 1 hour.

In this case, the user can set timer circuit 152 with the same operating time of 4 hours by pressing button 370 three times in a row, so that the specified time is incremented by 3 hours from the default setting of 1 hour. Similarly, indicator LED LED3 is on and indicator LEDs LED1, LED2 and LED4 are off.

It is noted that while in FIG. 3, numbers can be expressed by indicator LEDs LED1-LED4 in a binary numeral system, different base-N numeral systems may be used. In addition, indicator LEDs LED1-LED4 may also be used to simply express four different operation modes or four different preset specified times. The number of indicator LEDs attached to the outer portion of housing 310 in electrical safety apparatus 300 may be modified based on different applications or models, and thus embodiments shown in FIG. 3 are merely examples and not meant to limit the present disclosure.

Additionally, in some embodiments, electrical safety apparatus 300 can include an indicator light 320, a reset switch 330, and a test switch 340 located on the outer portion of housing 310. Indicator light 320 can be configured to light up when the power is supplied to power output 120, or it can be configured to light up when the power transmission to power output 120 is disabled. In some embodiments, the user can interact with electrical safety apparatus 300 without any visual interaction. For example, the user is able to feel the position of button 370 and/or other components (e.g., reset switch 330 and test switch 340) to perform operations. In some embodiments, reset switch 330, test switch 340, and/or button 370 may provide a tactile feedback with a mechanical (or an electrical) mechanism in response to the user's operation. For example, when the user performs a command on any one of reset switch 330, test switch 340, or button 370, the switch or button may respond by creating a slight vibration. In some embodiments, electrical safety apparatus 300 may also generate a sound (e.g., a beep) when the switch or button is activated. Reset switch 330 can be configured to reset electrical safety apparatus 100, by closing switches 148a, 148b after GFCI control circuit 144 has triggered solenoid 146, in order to pass current to power output 120. Test switch 340 can be configured to check whether solenoid 146 functions normally by triggering solenoid 146 to open switches 148a, 148b. After pressing test switch 340 and ensuring solenoid 146 is functioning, a user may press reset switch 330 to close switches 148a, 148b, instructing GFCI control circuit 144 to supply power to power output 120 again.

In some embodiments, housing 310 may enclose load terminals 350. Load terminals 350 can be electrically coupled with the electrical output of GFCI module 140, and electrically coupled with power output 120. In some embodiments, wires may pass through housing exit 360 and connect power output 120 to terminals 350. In some other embodiments, power output 120 may be wired directly to GFCI module 140.

Figure 4:
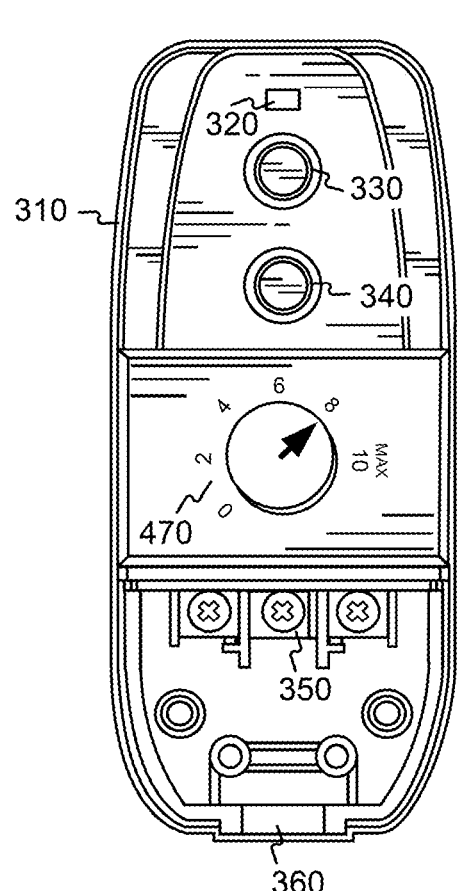
FIG. 4 illustrates another exemplary housing for an electrical safety apparatus with a timer, consistent with some embodiments of the present disclosure.

Reference is made to FIG. 4, which illustrates another exemplary housing 310 for an electrical safety apparatus 400, consistent with some embodiments of the present disclosure. As shown in FIG. 4, in some other embodiments, housing 310 may have a dial or knob 470 functioned as selection mechanism 154, with a ring of numbers or texts printed or provided around dial or knob 470 for indicating the current setting on the outer portion of housing 310. The user can simply rotate dial or knob 470 to set the desired time. For example, by operating dial or knob 470 to align an indicating arrow on dial or knob 470 with the number "2" printed on housing 310, the user can set timer circuit 152 with an operating time of 2 hours, so that power is delivered to the load connected to power output 120 for 2 hours. In some embodiments, selection mechanism 154 may include multiple control dials and/or adjusting knobs for different configurations or may include both button(s) 370 and dial(s) or knob(s) 470 for different configurations. It would be appreciated that while in electrical safety apparatus 300 or 400 of FIG. 3 and FIG. 4, components for interaction with the user are arranged on a front face of housing 310, in some other examples, some or all of these components may be placed on the side of electrical safety apparatus 300 or 400.

Electrical safety apparatus 300 or 400 described above can achieve auto-monitoring and be capable of continuously monitoring the functionality and accuracy of the GFCI function, in order to guarantee that the GFCI circuit works properly until the service life is reached. Particularly, the auto-monitoring function allows for periodic, automatic testing of the ability of electrical safety apparatus 300 or 400 to respond to a ground fault. This testing can be done without opening the circuit interrupter contacts and will not compromise the ability of the GFCI circuit to respond to an actual ground fault or a grounded neutral fault. Specifically, in some embodiments, electrical safety apparatus 300 or 400 performs automatic test each time power becomes available to the load terminal(s) or alternatively line terminal(s) of a properly wired GFCI. The automatic test can be initiated within a predetermined time (e.g., 5 seconds) of power availability to the line or load terminals and can be repeated according to a predetermined time period (e.g., at least every three hours).

Figure 5A:
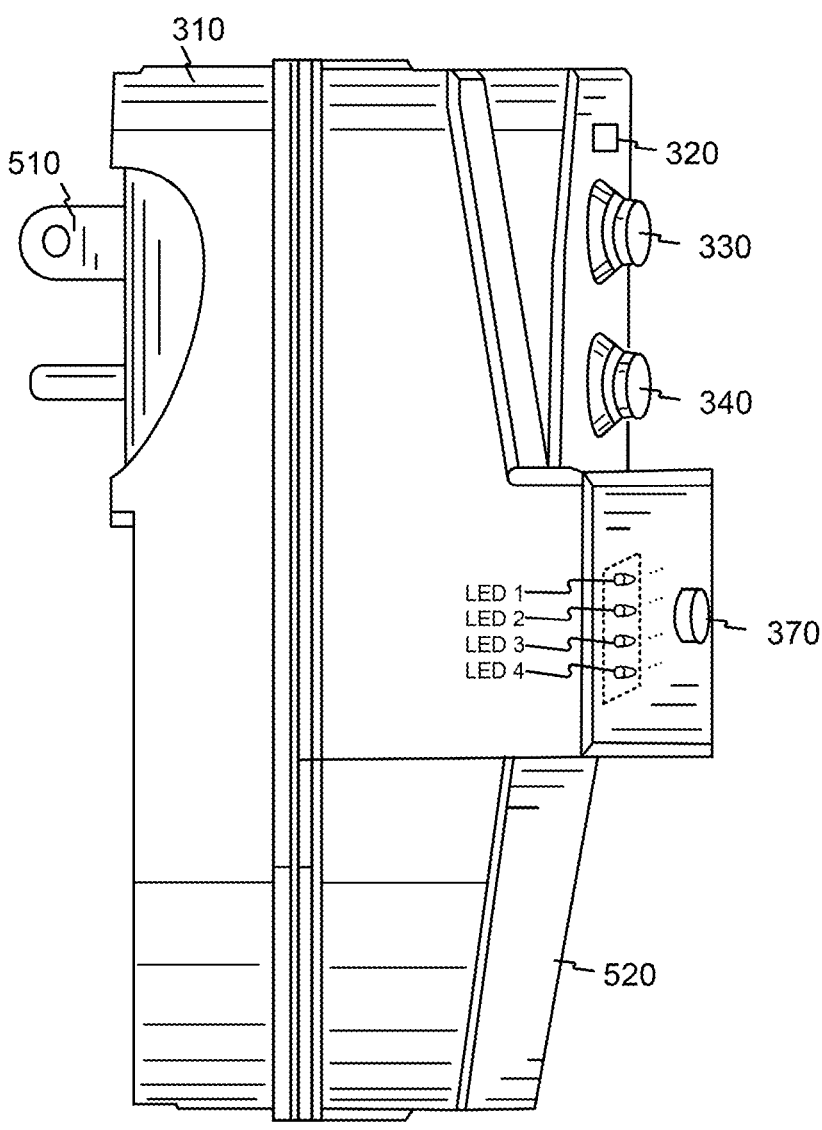
FIG. 5A illustrates an alternate view of the exemplary housing for the electrical safety apparatus with the timer of FIG. 3, consistent with some embodiments of the present disclosure.
Figure 5B:
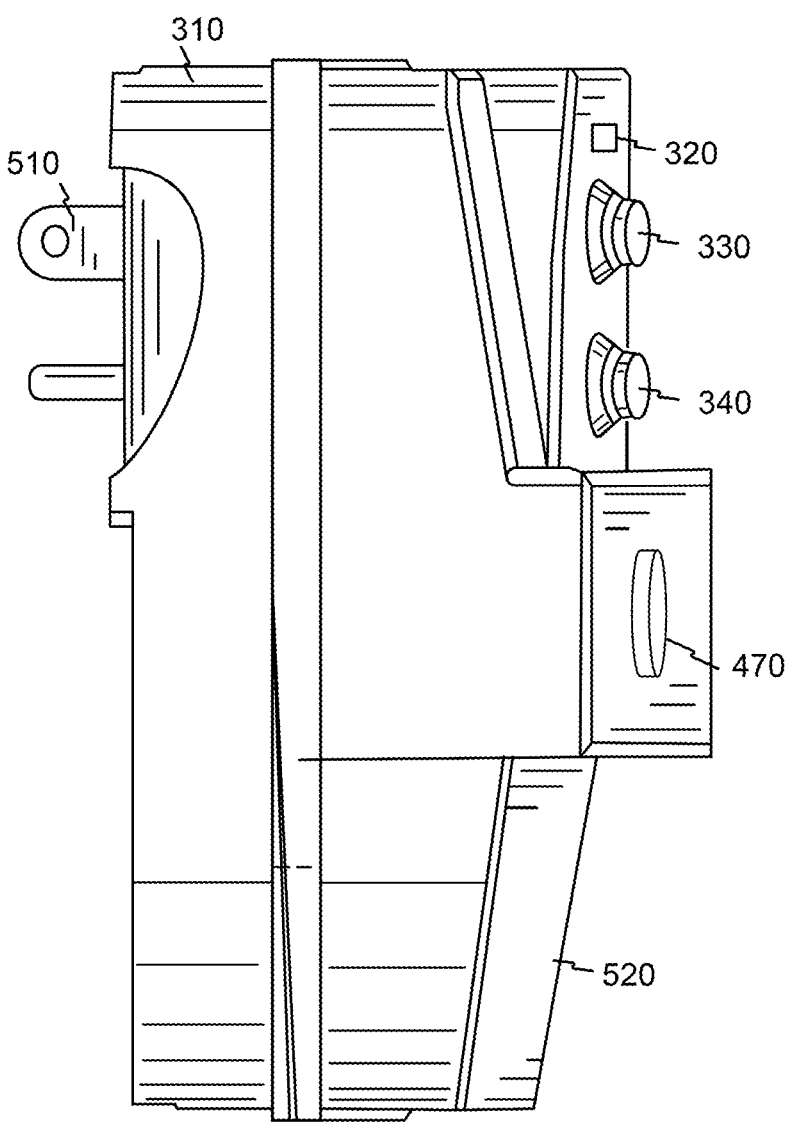
FIG. 5B illustrates an alternate view of the exemplary housing for the electrical safety apparatus with the timer of FIG. 4, consistent with some embodiments of the present disclosure.

FIG. 5A and FIG. 5B respectively illustrate alternate views of housing 310 for electrical safety apparatus 300 and 400 in FIG. 3 and FIG. 4, consistent with some embodiments of the present disclosure. As shown in FIG. 5A and FIG. 5B, in some embodiments, a plug 510 may be integrated in housing 310 and electrically coupled with power input 110, which allows power input 110 to be connected to an electrical outlet. In some embodiments, housing 310 may include a cover 520 in order to cover the electrical connections at the terminals 350. Cover 520 may be secured by various means, including screws, hinges, or adhesives.

Figure 6:
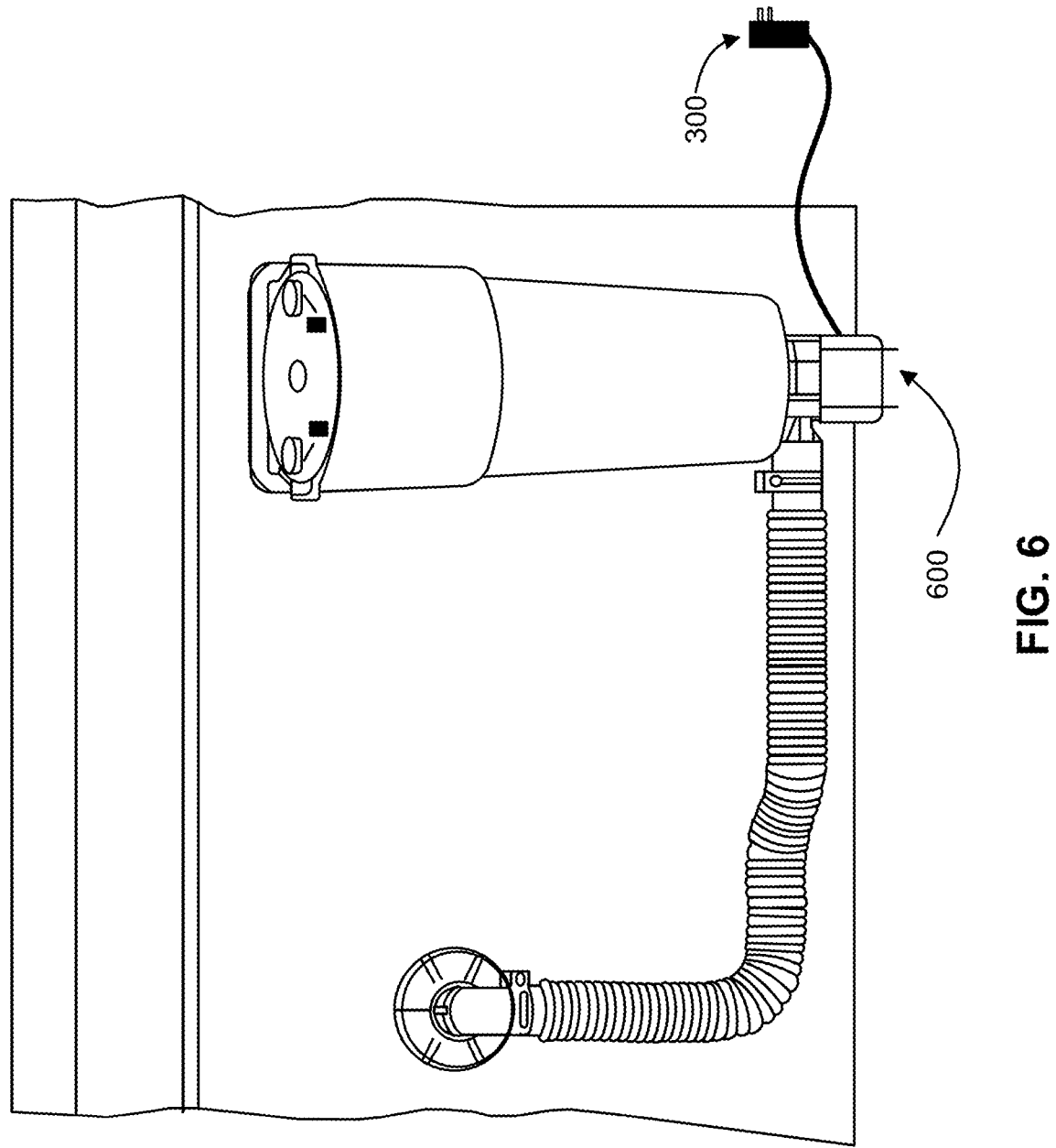
FIG. 6 illustrates an exemplary swimming pool pump with an integrated electrical safety apparatus, consistent with some embodiments of the present disclosure.
Figure 7:
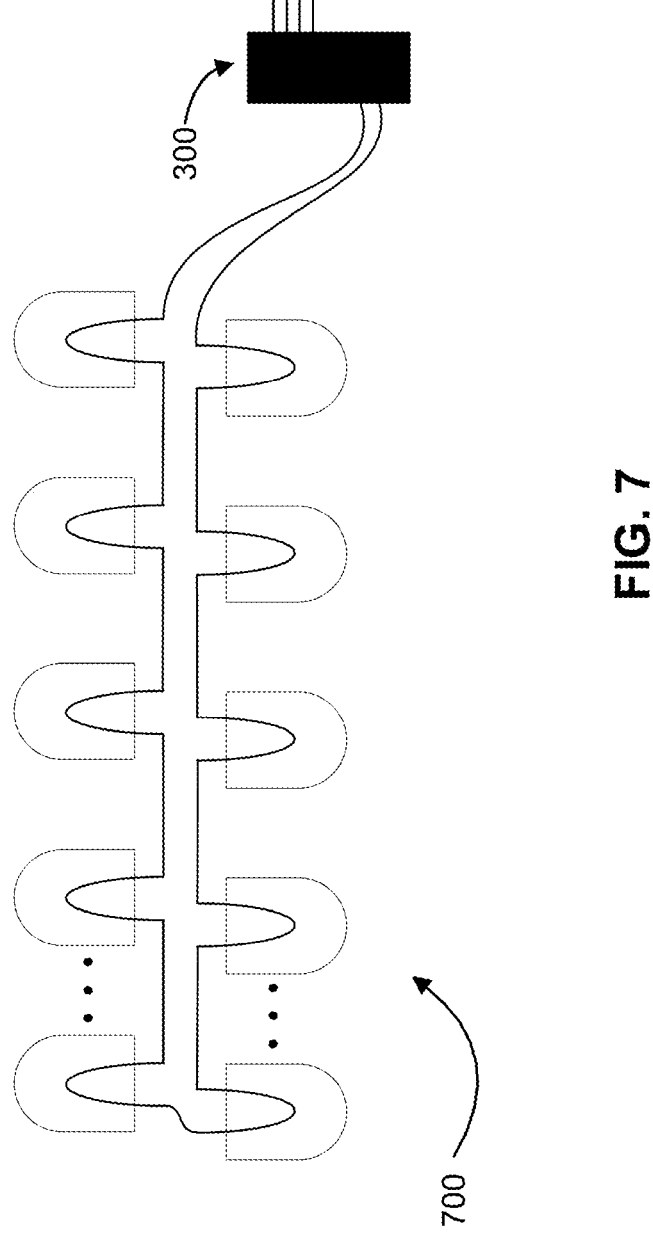
FIG. 7 illustrates an exemplary string of lights with an integrated electrical safety apparatus, consistent with some embodiments of the present disclosure.

In some embodiments, housing 310 may have a wire with a plug electrically coupled with power input 110 exiting therefrom. In some applications, as opposed to integrated into housing 310, a plug connecting to the wire may be convenient under various situations. For example, such design may be suitable for use if the electrical outlet is at an inconvenient location. By the plug with the wire, housing 310 is able to be located at a more convenient location, which may aid a user in activating the timer or GCFI functions. In some embodiments, an electrical outlet electrically coupled with the output of GFCI module 140 is disposed on housing 310 to allow power output 120 to be plugged into housing 310. In some applications, such arrangement may allow electrical safety apparatus 100 to be used with accessories, such as pumps or Christmas lights, that have been purchased separately. Alternatively, as illustrated in FIG. 6, electrical safety apparatus 300 may be formed integrally with an electrical device, such as a pump 600 for a swimming pool. In some other embodiments, as illustrated in FIG. 7, electrical safety apparatus 300 may also be formed integrally with a light string 700. For example, light string 700 may be Christmas lights or any other indoor or outdoor holiday lighting products, but the present disclosure is not limited thereto.

In some embodiments, as mentioned above, selection mechanism 154 can be achieved by various designs. FIG.

Figure 8B:
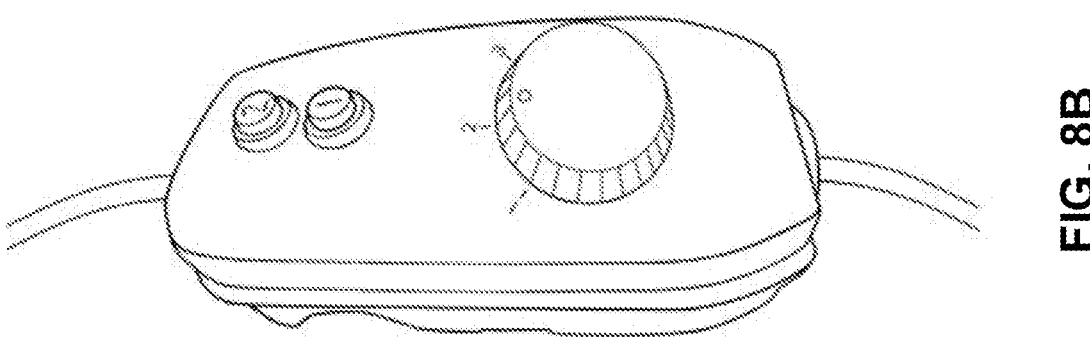
FIG. 8A-FIG. 8H illustrate exemplary electrical safety apparatus designs, consistent with some embodiments of the present disclosure.
Figure 8A:
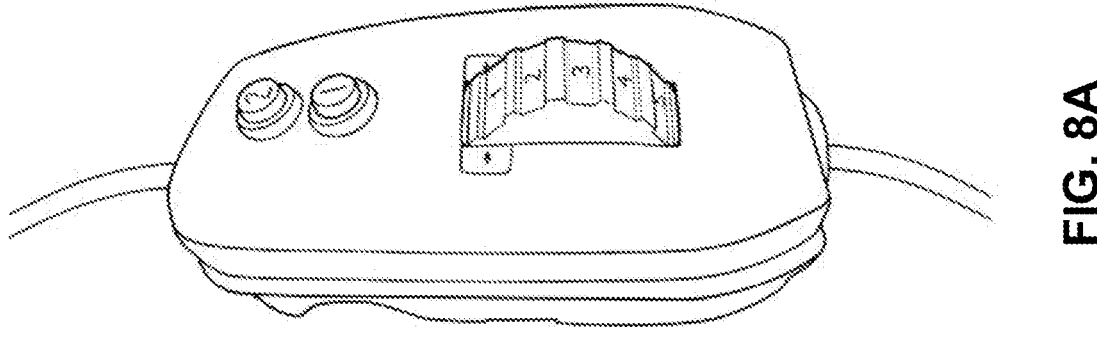
Figure 8D:
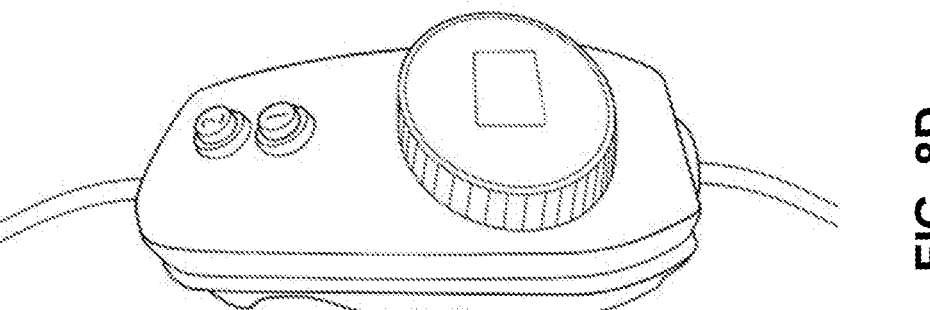
Figure 8C:
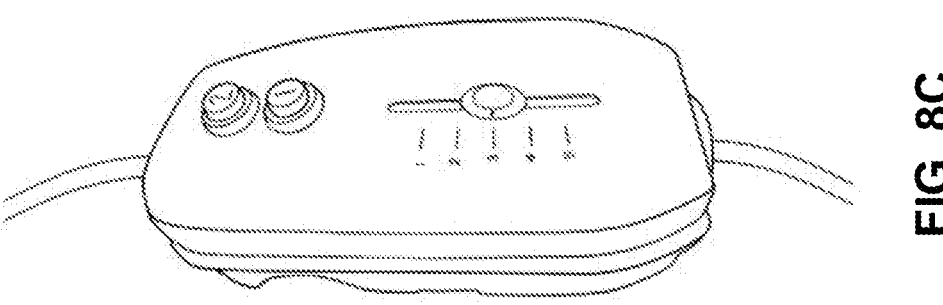
Figure 8G:
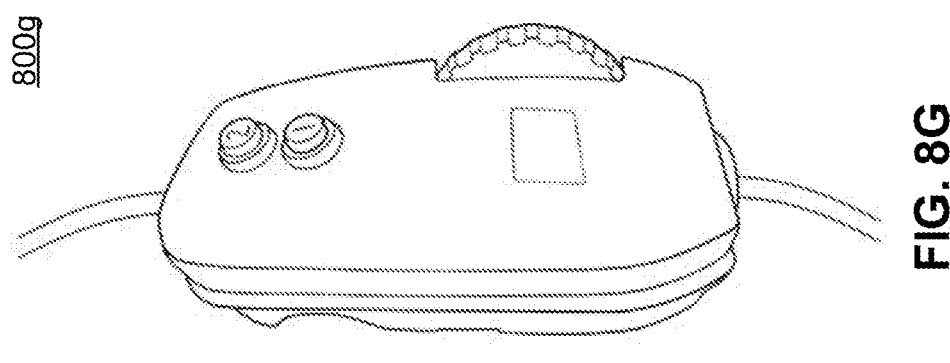
Figure 8F:
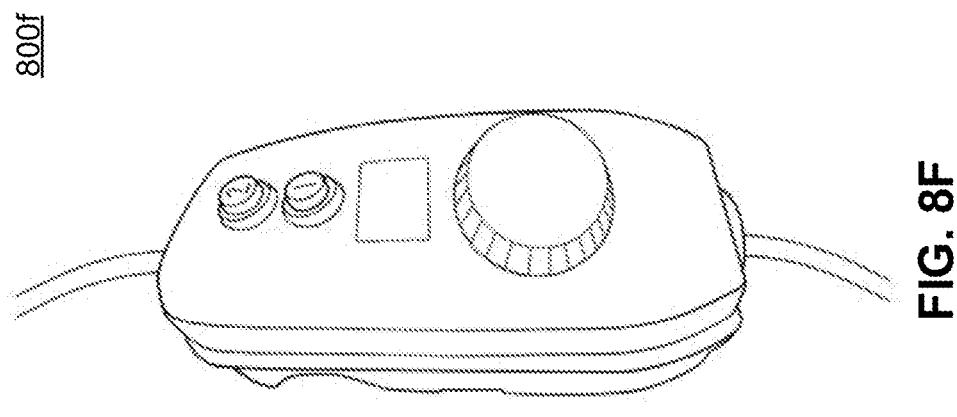
Figure 8E:
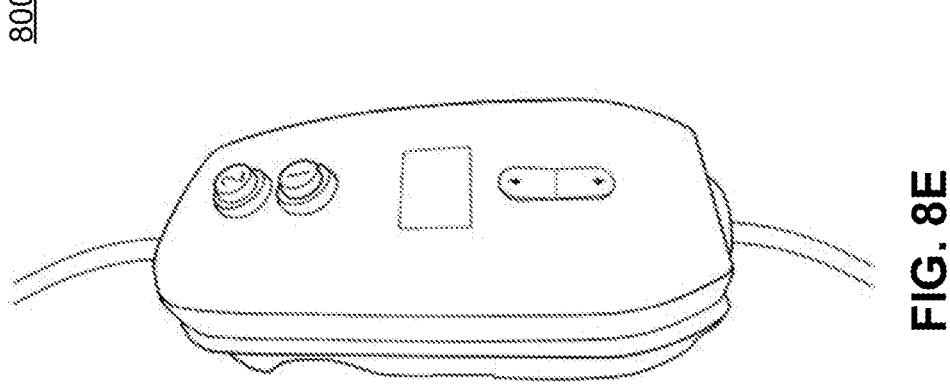
Figure 8H:
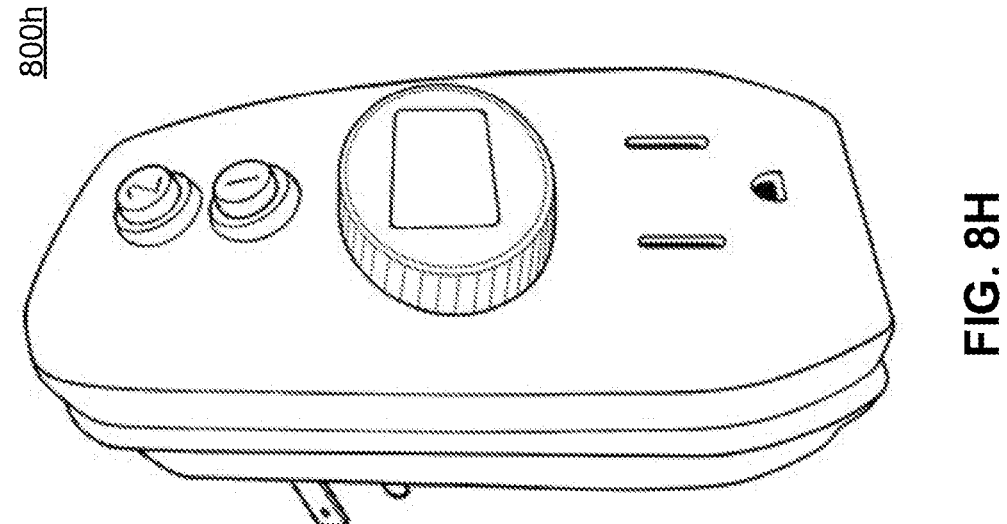

8A-FIG. 8H illustrate exemplary electrical safety apparatus designs, consistent with some embodiments of the present disclosure. As shown in the figures, electrical safety apparatus 800a-800h may include different types of means for selection, in order to satisfy practical needs in different applications or products. For example, FIG. 8A illustrate electrical safety apparatus 800a using a recessed wheel as selection mechanism 154. FIG. 8B illustrate electrical safety apparatus 800b using a knob dial as selection mechanism 154. FIG. 8C illustrate electrical safety apparatus 800c using a scrubber switch as selection mechanism 154. Electrical safety apparatus 800a-800c may use various analog displays to indicate the current time settings, but the present disclosure is not limited thereto.

FIG. 8D illustrate electrical safety apparatus 800d using a display framed by a knob as selection mechanism 154. FIG. 8E illustrate electrical safety apparatus 800e using a rocker switch as selection mechanism 154. FIG. 8F illustrate electrical safety apparatus 800f using a knob as selection mechanism 154. FIG. 8G illustrate electrical safety apparatus 800g using a side rotating wheel as selection mechanism 154.

Electrical safety apparatus 800d-800g may use various digital displays to indicate the current time settings, but the present disclosure is not limited thereto.

FIG. 8H illustrate electrical safety apparatus 800h without cords. As shown in FIG. 8H, electrical safety apparatus 800h can be a free-standing unit including the GFCI module and the timer. Electrical safety apparatus 800h can provide one or more power sockets on its housing, so that a user can connect any electrical device to the power source via electrical safety apparatus 800h to enable the timer function and the GFCI protection function. For example, electrical safety apparatus 800h may be connected to several household items, such as electric lawnmowers, water fountains, power tools, etc.

It would be understood that designs illustrated in FIG. 8A-FIG. 8H are only examples and not meant to limit the present disclosure. Certain adaptations and/or modifications can be made without departing from the spirit of the present disclosure. For example, in some embodiments, electrical safety apparatus can be controlled by an electrical device communicatively coupled to the electrical safety apparatus via wireless communications, such as 4G or 5G cellular connections, WIFI, Bluetooth, Bluetooth Low-Energy (BLE) for Wi-Fi commissioning, etc. In some embodiments, the electrical safety apparatus and the control device (e.g., a smartphone, a tablet, a laptop, a wearable device, etc.) can be connected to a server, a private cloud or a public cloud via wireless communications, so that the control device can serve as the digital display. Accordingly, the electrical safety apparatus can be realized without physical display panels or even without input interfaces, as the configuration command can be transmitted from the control device. As part of an integrated Internet-of-Thing (IoT) system, instant alerts can also be sent by the electrical safety apparatus through a software application to the user's smartphones, tablets, or wearable devices to notify the user when an abnormal status (e.g., a ground fault) is detected.

As described above, embodiments of the present disclosure provide several capabilities. In some embodiments, for example, a user can set timer 150 to turn an electrical device on or off at a specified time. In some embodiments, for example, the present disclosure can be configured to turn a pool pump on at a first time and turn the pump off at a second time. In some embodiments, the present disclosure can be configured to turn Christmas lights on at a first time and turn the lights off at a second time. Accordingly, because the timer is integrated into electrical safety apparatus 100 of the pool pump or the Christmas lights, customers do not need to buy a separate timer. As explained above, in some embodiments, electrical safety apparatus 100 does not provide any liquid-crystal display (LCD) or other active screen to display the timer information. Thus, by eliminating the display screen, the size and the manufacturing cost of electrical safety apparatus 100 can be reduced and the design of electrical safety apparatus 100 can be more flexible.

The embodiments may further be described using the following clauses:

1. An electrical safety apparatus comprising:
   a ground fault circuit interrupter module comprising:
      a sensor configured to output a differential current signal according to a current flowing to and from an electrical load;
      a ground fault circuit interrupter circuit in electrical communication with the sensor; and
      one or more switches arranged on one or more communication paths for supplying power to the electrical load; and
   a timer module in electrical communication with the ground fault circuit interrupter module and configured to generate a timer signal, wherein responsive to the differential current signal or the timer signal, the ground fault circuit interrupter circuit generates a driving signal to selectively open or close the one or more switches; and
   a housing without a display screen, the housing enclosing the ground fault circuit interrupter module and the timer module.
2. The electrical safety apparatus of clause 1, wherein the timer module comprises:
   a timer circuit configured to generate the timer signal; and
   a selection mechanism in electrical communication with the timer circuit.
3. The electrical safety apparatus of clause 1, wherein the selection mechanism comprises one or more buttons, one or more dials, one or more knobs, one or more wheels, one or more switches, or any combination thereof.
4. The electrical safety apparatus of clause 1, further comprising:
   a plurality of light-emitting diodes attached to the housing and configured to provide an indication associated with the timer signal.
5. The electrical safety apparatus of clause 4, wherein the plurality of light-emitting diodes indicate an amount of time remaining before a power transmission to the electrical load is disabled.
6. The electrical safety apparatus of clause 4, wherein the plurality of light-emitting diodes indicate a time of day when a power transmission to the electrical load is disabled.
7. The electrical safety apparatus of clause 1, further comprising:
   one or more power converters in electrical communication with a power input of the electrical safety apparatus and one or more of the ground fault circuit interrupter module and the timer module.
8. The electrical safety apparatus of clause 7, wherein the one or more power converters comprise a first alternating current to direct current converter in electrical communication with the input line and the ground fault circuit interrupter module, and a second alternating current to direct current converter in electrical communication with the input line and the timer module.

9. The electrical safety apparatus of clause 1, wherein the housing further comprises an electrical plug for connecting to an electrical outlet.
10. The electrical safety apparatus of clause 9, wherein the housing further comprises an electrical outlet in electrical communication with a power output of the electrical safety apparatus.
11. The electrical safety apparatus of clause 1, wherein the electrical safety apparatus is integrated into a pump for a swimming pool.
12. The electrical safety apparatus of clause 1, wherein the electrical safety apparatus is integrated into a string of lights.
13. The electrical safety system of clause 1, wherein the ground fault circuit interrupter module further comprises a solenoid for operating the one or more switches in response to the driving signal generated by the ground fault circuit interrupter circuit, and the ground fault circuit interrupter module is configured to generate the driving signal causing the solenoid to open the one or more switches, in response to receipt of the differential current signal, from the sensor, indicating an undesirable change in current.
14. The electrical safety apparatus of clause 1, wherein a maximum operating time is preset in the timer module, and the timer circuit is configured to provide a termination signal to disable a power transmission to the electrical load when the maximum operating time is reached.
15. A method for providing electricity to a device, comprising:
   disconnecting an input line from the device by opening one or more switches when a current sensor in a ground fault circuit interrupter module senses an undesired change in current;
   indicating a configuration of a timer module by one or more indicator light-emitting diodes arranged on a housing without a display screen, and generating a first timer signal or a second timer signal by the timer module according to the configuration accordingly;
   responsive to receipt of the first timer signal, generating, by the ground fault circuit interrupter module, a first signal for connecting the input line to the device; and
   responsive to receipt of the second timer signal, generating, by the ground fault circuit interrupter module, a second signal for disconnecting the input line from the device.
16. The method of clause 15, further comprising:
   providing an alternating current to direct current converter connected to the input line and in electrical communication with the ground fault circuit interrupter module and the timer module.
17. The method of clause 15, further comprising:
   providing a first alternating current to direct current converter connected to the input line and in electrical communication with the ground fault circuit interrupter module; and
   providing a second alternating current to direct current converter connected to the input line and in electrical communication with the timer module.
18. The method of clause 15, wherein the second timer signal indicates that the device should not be energized a specific time after the timer module has been set.
19. The method of clause 15, wherein the first timer signal indicates that the device should be energized at a specific time of day.

20. The method of clause 15, wherein the second timer signal indicates that the device should not be energized at a specific time of day.

Embodiments herein include apparatus, systems, methods, and tangible non-transitory computer-readable media. The methods may be executed, for example, by at least one processor that receives instructions from a tangible non-transitory computer-readable storage medium. Similarly, electrical safety systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used in the specification and the appended claims, the singular forms "a," "an" and "the" include plural references unless specifically stated otherwise or infeasible. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the disclosure are intended to be illustrative and not restrictive. Many suitable materials that would perform the same or a similar function as the materials described herein are intended to be embraced within the scope of the disclosure. Such other materials not described herein can include, but are not limited to, for example, materials that are developed after the time of the development of the disclosure.

Several features of the present disclosure are defined to be in electrical communication with other features of the present disclosure. As used herein, element A is in electrical communication with element B if element A and element B are coupled to each other in such a way that electrical current can pass along a communication path from element A to element B or from element B to element A. Further, electrical communication between two elements may be direct or indirect. As used herein, element A is in direct electrical communication with element B if the communication path between element A and element B has an electrical resistance of substantially zero ohms. As used herein, element A is in indirect electrical communication with element B if the communication path between element A and element B has an electrical resistance with a magnitude greater than substantially zero ohms. Moreover, whenever any two features of the present disclosure are said to be in electrical communication with each other, the two features may by in electrical communication via an electrical connection element. As used herein and as those skilled in the art would recognize, an electrical connection element can be electrical connection elements known in the art or developed at a later time, including but not limited to, an electrical conductor, a combination of electrical components, e.g. resistors, capacitors, inductors, and the like, an electrical circuit, solder, and the like. Further, an electrical connection element can provide direct or indirect electrical communication between two elements.

As used herein, unless specifically stated otherwise, the term "or" encompasses all possible combinations, except where infeasible. For example, if it is stated that a system or a module may include A or B, then, unless specifically stated otherwise or infeasible, the system or the module may include A, or B, or A and B. As a second example, if it is stated that the system or the module may include A, B, or C, then, unless specifically stated otherwise or infeasible, the system or the module may include A, or B, or C, or A and B, or A and C, or B and C, or A and B and C.

In the foregoing specification, certain systems and methods related to electrical safety systems and timers have been described with reference to numerous specific details that can vary from implementation to implementation. Certain adaptations and modifications of the described embodiments can be made without departing from the spirit and scope of the system, method, and their equivalents, as set forth in claims to be filed in a later, non-provisional application. Other embodiments can be apparent to those skilled in the art from consideration of the specification and practice of the disclosure disclosed herein. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other devices, methods, and systems for carrying out the several purposes of the embodiments and claims presented in this application. It is intended that the specification and examples be considered as exemplary only, with a true scope and spirit of the disclosure being indicated by the following claims.

What is claimed is:

1. An electrical safety apparatus comprising:
a housing without a visual display;
a ground fault circuit interrupter module disposed within the housing comprising:
  a sensor configured to output a differential current signal according to a current flowing to and from an electrical load;
  a ground fault circuit interrupter circuit in electrical communication with the sensor;
  a receiver configured to receive a command signal from a wireless communication device; and
  one or more switches arranged on one or more communication paths for supplying power to the electrical load;
a timer module disposed within the housing in wireless communication with the ground fault circuit interrupter module and configured to generate a timer signal as the command signal in response to a user-operated control device signal, wherein responsive to the differential current signal or the timer signal, the ground fault circuit interrupter circuit is configured to generate a driving signal to selectively open or close the one or more switches, wherein the ground fault circuit interrupter circuit generates the driving signal in response to receiving the command signal; and
a selection mechanism comprising one or more rotatable dials configured to set a set time of the timer signal.

2. The electrical safety apparatus of claim 1, wherein the timer module comprises:
a timer circuit configured to generate the timer signal;
wherein the selection mechanism is in electrical communication with the timer circuit.

3. The electrical safety apparatus of claim 1, wherein the selection mechanism further comprises one or more buttons, one or more knobs, one or more wheels, one or more switches, or any combination thereof.

4. The electrical safety apparatus of claim 1, further comprising a ring of numbers or texts provided on or around the one or more rotatable dials for displaying a time associated with the timer signal.

5. The electrical safety apparatus of claim 4, wherein the one or more rotatable dials are located on the front face housing.

6. The electrical safety apparatus of claim 4, further comprising one or more buttons located on the housing configured to adjust a set time of the timer signal by a predetermined increment and decrease the set time of the timer signal by a predetermined decrement.

7. The electrical safety apparatus of claim 1, further comprising:
one or more power converters in electrical communication with a power input of the electrical safety apparatus and one or more of the ground fault circuit interrupter module and the timer module.

8. The electrical safety apparatus of claim 7, wherein the one or more power converters comprise a first alternating current to direct current converter in electrical communication with the input line and the ground fault circuit interrupter module, and a second alternating current to direct current converter in electrical communication with the input line and the timer module.

9. The electrical safety apparatus of claim 1, wherein the housing further comprises an electrical plug for connecting to an electrical outlet.

10. The electrical safety apparatus of claim 9, wherein the housing further comprises an electrical outlet in electrical communication with a power output of the electrical safety apparatus.

11. The electrical safety apparatus of claim 1, wherein the electrical safety apparatus is integrated into a pump for a swimming pool.

12. The electrical safety apparatus of claim 1, wherein the electrical safety apparatus is integrated into a string of lights.

13. The electrical safety system of claim 1, wherein the ground fault circuit interrupter module further comprises a solenoid for operating the one or more switches in response to the driving signal generated by the ground fault circuit interrupter circuit, and the ground fault circuit interrupter module is configured to generate the driving signal causing the solenoid to open the one or more switches, in response to receipt of the differential current signal, from the sensor, indicating an undesirable change in current.

14. The electrical safety apparatus of claim 1, wherein a maximum operating time is preset as a default setting in the timer module, and the timer circuit is configured to provide a termination signal to disable a power transmission to the electrical load when the maximum operating time is reached.

15. A method for providing electricity to a device, comprising:
disconnecting an input line from the device by opening one or more switches when a current sensor in a ground fault circuit interrupter module senses an undesired change in current;
responsive to receipt of a wireless command signal from a user-operated control device, indicating a configuration of a timer module by a selection mechanism comprising one or more rotatable dials, and generating a first timer signal or a second timer signal by the timer module according to the configuration accordingly, wherein the housing does not include any visual display;
responsive to receipt of the first timer signal, generating, by the ground fault circuit interrupter module, a first signal for connecting the input line to the device;
responsive to receipt of the second timer signal, generating, by the ground fault circuit interrupter module, a second signal for disconnecting the input line from the device; and
wherein the one or more rotatable dials are configured to set a first set time associated with the first timer signal or a second set time associated with the second timer signal.

16. The method of claim 15, further comprising:
providing an alternating current to direct current converter connected to the input line and in electrical communication with the ground fault circuit interrupter module and the timer module.

17. The method of claim 15, further comprising:
providing a first alternating current to direct current converter connected to the input line and in electrical communication with the ground fault circuit interrupter module; and
providing a second alternating current to direct current converter connected to the input line and in electrical communication with the timer module.

18. The method of claim 15, wherein the second timer signal indicates that the device should not be energized a specific time after the timer module has been set.

19. The method of claim 15, wherein the first timer signal indicates that the device should be energized at a specific time of day.

20. The method of claim 15, wherein the second timer signal indicates that the device should not be energized at a specific time of day.

\* \* \* \* \*